REGULATED POWER SUPPLY

Filed Feb. 25, 1960 2 Sheets-Sheet 1

INVENTORS
ROBERT B. HUNTER &
ROBERT F. ARCHER
BY Louis A. Kline
Richard G. Stahr
THEIR ATTORNEYS April 23, 1963 R. B. HUNTER ETAL 3,087,107

REGULATED POWER SUPPLY

Filed Feb. 25, 1960 2 Sheets-Sheet 2

INVENTORS
ROBERT B. HUNTER &
ROBERT F. ARCHER

BY Louis A. Kline
Richard G. Stahr
THEIR ATTORNEYS

United States Patent Office 3,087,107

Patented Apr. 23, 1963

3,087,107

REGULATED POWER SUPPLY

Robert B. Hunter, Piqua, and Robert F. Archer, Clayton, Ohio, assignors to The National Cash Register Company, Dayton, Ohio, a corporation of Maryland Filed Feb. 25, 1960, Ser. No. 10,898
1 Claim. (Cl. 321—19)

The present invention relates to direct current power supplies and, more specifically, to the arrangement for maintaining the output potential level of a direct current power supply substantially constant.

In a variety of applications, particularly in the electronic computer and digital data processing areas, it is mandatory that the direct current potential levels supplied to equipment of this type be maintained at a substantially constant value to insure a minimum of disturbance in the delicate utilization circuitry. As the use of equipment of this type is becoming increasingly widespread, the requirement of a closely-regulated direct current power supply is apparent.

It is, therefore, an object of this invention to provide an improved direct current power supply.

It is another object of this invention to provide an improved direct current power supply wherein the direct current output potential level is maintained substantially constant.

In accordance with this invention, the maximum input alternating current potential magnitude available as a corresponding direct current potential level at the cathode of each rectifier device of a direct current power supply is determined by the impedance of a variable impedance element of the type having impedance characteristics which are a function of current connected in a supply current circuit between the alternating current energy source and each rectifier device of the direct current power supply. At least a portion of the load current and a control bias current, which is proportional to the direct current output potential level, are applied to the variable impedance element in such a manner as to alter the impedance thereof with the supply current for correcting decreases of output direct current potential level and opposite the supply current for correcting increases of output direct current potential level, respectively.

Figures 1, 2:
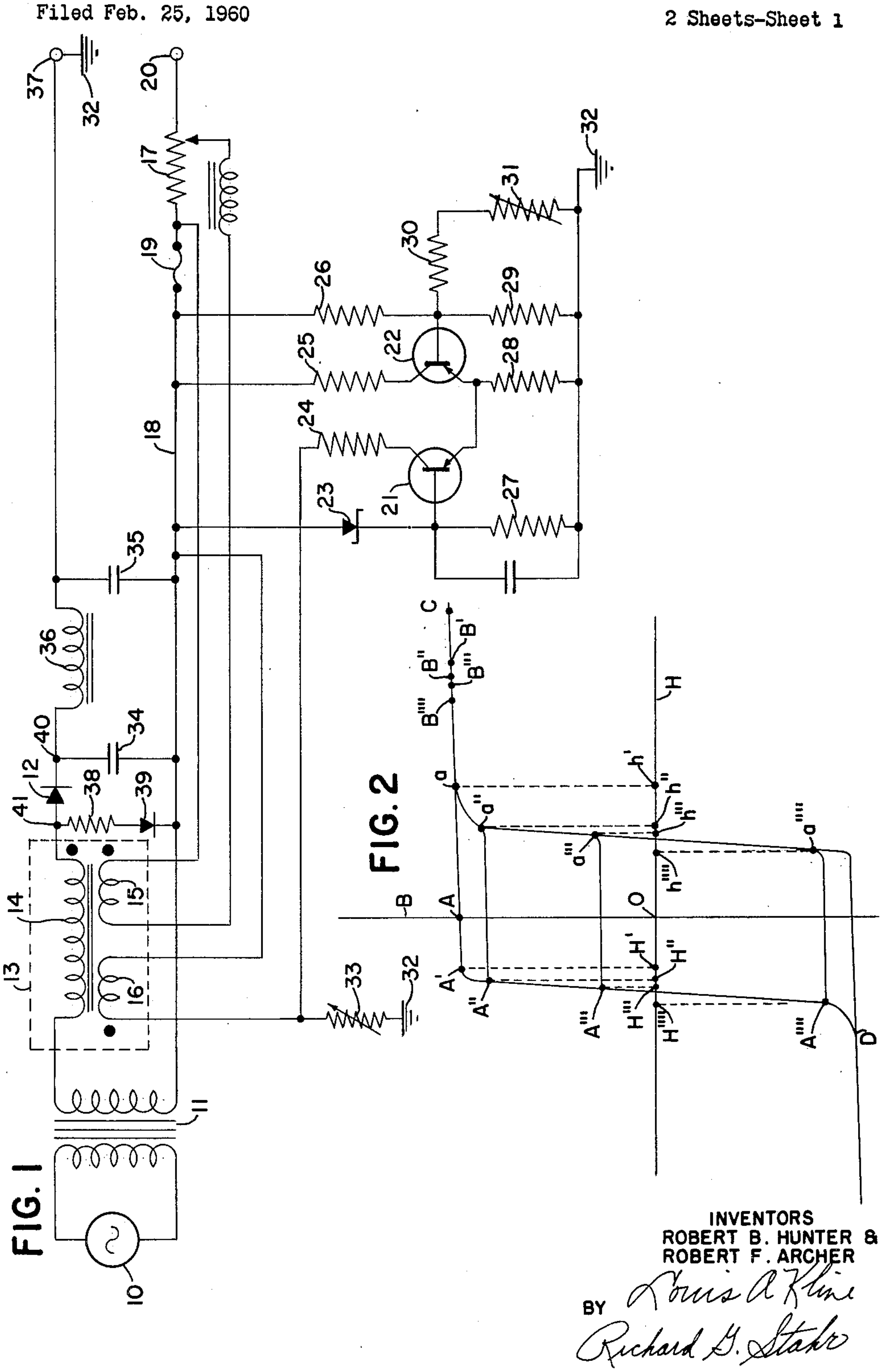

For a better understanding of the present invention, together with further objects, advantages, and features thereof, reference is made to the following description and to the accompanying drawings, in which:

FIGURE 1 is a schematic diagram of a preferred embodiment of the present invention, FIGURE 2 is a hysteresis loop helpful in understanding the operation of the present invention, and FIGURES 3*a* through 3*d*, inclusive, are curves also helpful in understanding the present invention.

A source of single phase alternating current energy 10, the details of which form no part of this invention and may be any one of several well known in the art, is symbolically indicated in FIGURE 1 and is shown as being coupled through transformer 11 to a direct current power supply circuit incorporating the arrangement of this invention, as will presently be brought out.

Connected between the source of alternating current energy 10 and a rectifier diode 12 is a variable impedance element, schematically illustrated within dashed-line rectangle 13, of the type which has impedance characteristics which are a function of current. A highly satisfactory element of this type has been found to be a magnetic device having a core member made up of a material having substantially square hysteresis loop characteristics about which are wound a main coil 14 in the supply circuit, for translating the supply current; a feed-back coil 15, for applying at least a portion of the load current to element 13; and a bias coil 16, for applying a control bias current, to be later described, to element 13. As the core member of element 13 is made up of a material having substantially square hysteresis loop characteristics, this element has either a very high impedance, in the unsaturated state, or a very low impedance, in the saturated state. Therefore, the impedance of element 13 is a function of current in that its impedance is determined by the resultant of the magnetic flux produced by current flow in the main coil, the feed-back coil, and the bias coil, as will be described later.

So that at least a portion of the load current may be applied to variable impedance element 13 for correcting decreases of output direct current potential level, feedback coil 15 is connected in a parallel relationship with a potentiometer 17 included in negative output line 18 between fuse 19 and negative output terminal 20. The polarity of feed-back coil 15 is selected to alter the impedance of element 13 with the supply current flowing through main coil 14. That is, the flux produced by load current flow through feed-back coil 15 adds to the flux produced by supply current flow through main coil 14. Because the impedance of element 13 is determined by the state of saturation of the core member, the aiding flux produced by feed-back coil 15 as a result of the load current alters the impedance of element 13 with the supply current, both contributing to the saturation of the core. In actual practice, the load current may be of sufficient magnitude to require less than a single turn of feed-back coil to produce the required flux. As only a fraction of a turn cannot be placed upon a core, the effective equivalent of a fraction of a turn may be realized through the parallel relationship of feed-back coil 15 and potentiometer 17. With this arrangement, only a portion of the load current flows through feed-back coil 15, the magnitude of which may be adjusted by the slider arm of potentiometer 17. With applications having a load current of a lower magnitude, potentiometer 17 may be replaced by the feed-back coil. However, the presence of potentiometer 17 in any event affords a precise adjustment of feed-back current magnitude.

To produce a control bias current which is directly proportional to direct current output potential level for correcting increases and decreases of output direct current potential level, a potential-sensitive device may be connected into the output circuit of the power supply system. This device may be a differential amplifier consisting of two transistors 21 and 22, a diode 23, seven resistors 24 through 30, inclusive, and a potentiometer 31. The operation of this circuit will be described in detail later in this specification.

So that the control bias current produced by the differential amplifier circuit may be applied to variable impedance element 13, bias coil 16 is connected in series with the emitter-collector circuit of transistor 21. The polarity of bias coil 16 is selected to alter the impedance of element 13 in a manner opposite to that produced by the supply current flowing through main coil 14. That is, the flux produced by control bias current flow through bias coil 16 opposes the flux produced by supply current flow through main coil 14. Because the impedance of element 13 is determined by the state of saturation of the core member, the opposing flux produced by control bias current flow through bias coil 16 alters the impedance of element 13 in a sense opposite to that produced by the supply current, the main coil flux tending to produce saturation, while the bias coil flux tends to prevent saturation. To provide a proper bias upon the collector electrode of transistor 21, a potentiometer 33 is inserted between bias winding 16 and point of reference potential 32, as indicated.

The remainder of the circuit of the direct current potential power supply system is conventional, with the usual parallel filter capacitors 34 and 35 and series inductor 36. Positive output terminal 37 may be connected to point of reference potential 32, as indicated.

To more clearly illustrate the effect of the resultant flux produced by current flow in main winding 14, feedback winding 15, and bias winding 16 upon the impedance of element 13, a typical substantially square hysteresis loop characteristic curve is shown in FIGURE 2, where flux density B, the ordinate, is plotted against magnetomotive force H, the abscissa. The magnitude of magnetomotive force H, determined by the product of the number of turns in the coil producing it multiplied by the amperes of current flow therethrough or ampere-turns, increases from left to right along the horizontal coordinate. The magnitude of flux density B, determined by the magnitude of magnetomotive force H, follows the AD portion of the loop and increases vertically from the horizontal coordinate.

Correlating variable impedance element 13 with the hysteresis loop of FIGURE 2, the magnitude of magnetomotive force H is determined by the ampere-turns of main coil 14. As the number of turns of main coil 14 remain constant, magnetomotive force may be said to be a function of supply current only and, therefore, will hereinafter be treated as supply current magnitude values. Because of the series rectifier 12, each alternating current potential cycle will produce a flow of supply current through main coil 14 of variable impedance element 13 which is uni-directional and occurs only during the positive half of each cycle. Although there are an infinite number of flux density values along portion AD, points A′, A″, A‴, and A⁗ and the corresponding values of magnetomotive force H′, H″, H‴, and H⁗, respectively, have been arbitrarily selected for purposes of illustration. With a control bias current flow in bias coil 16, poled to alter the impedance of element 13 in a sense opposite to that produced by the supply current flow through main coil 14, a flux is generated which opposes the flux generated by the supply current flow in the main coil 14. This has the effect of decreasing the flux density, thereby moving point A of the hysteresis loop to the left, along portion AD, to point A′, for example. Additional increases of control bias current flow will move point A farther to the left along portion AD to points A″, A‴, and A⁗.

With the core member of impedance element 13 saturated, the impedance of element 13 is very low, and the flux density B is relatively constant at point A of the hysteresis loop of FIGURE 2. As the supply alternating current potential passes through the positive-going portion of each cycle under these conditions, a corresponding substantially in-phase supply current will flow through main winding 14, producing a flux density in the core member of element 13 which will follow the substantially horizontal portion, AC—CA, of the hysteresis loop of FIGURE 2 with increases and decreases of supply current with supply potential.

With the core member of impedance element 13 unsaturated, the impedance of element 13 is very high and remains substantially constant until the flux density reaches a value substantially equal to that of point A of FIGURE 2, at which time it abruptly drops to nearly zero. As the supply alternating current potential passes through the positive-going portion of each cycle under these conditions, the initial supply current flow is limited to an extremely low value. However, the magnitude of supply current does tend to increase with the supply potential as it passes through the cycle. Because very small increases in magnitude of magnetomotive force result in large increases in flux density, this small increase in supply current brings the core member toward the point of saturation. As illustrated in FIGURE 2, with an increase in supply current from H⁗ to *h*⁗, there is a corresponding increase in flux density from A⁗ to *a*⁗. As supply current increases with supply potential to points *h*‴ and *h*″, flux density increases to point *a*‴ and to near saturation point *a*″, respectively. Another small increase of supply current will, of course, saturate the core member, reducing the impedance of element 13 abruptly to nearly zero.

Figure 3A:
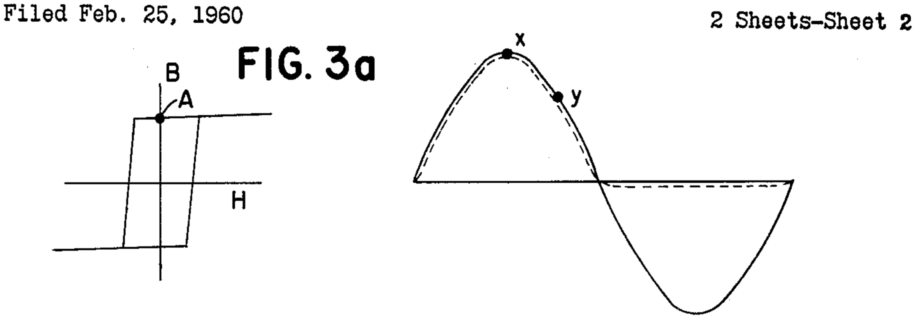

The relationship between the impedance of element 13 and direct current output potential is graphically shown by the potential diagrams of FIGURES 3*a* through 3*d*, in each of which supply potential magnitudes are represented as a solid-line curve and corresponding direct current potential levels available at the cathode of diode 12 are represented as a dashed-line curve. The B—H diagram to the left of each potential diagram indicates the flux density, hence control bias current magnitude, required for a particular output direct current potential level. FIGURE 3*a* indicates the flux density to be at the saturation point A, hence no control bias current. Because of the nearly zero impedance value of element 13 with the core member saturated and the accompanying insignificant potential drop thereacross during the positive portion of each supply potential cycle, substantially all input alternating current potential magnitudes appearing across the secondary winding of transformer 11 are available as corresponding direct current potential levels at the cathode of diode 12, as indicated.

Figure 3B:
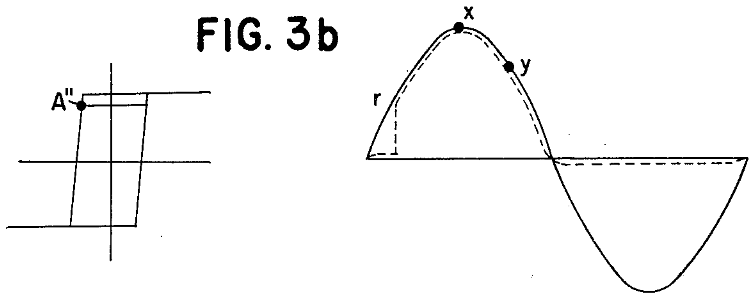
Figure 3C:
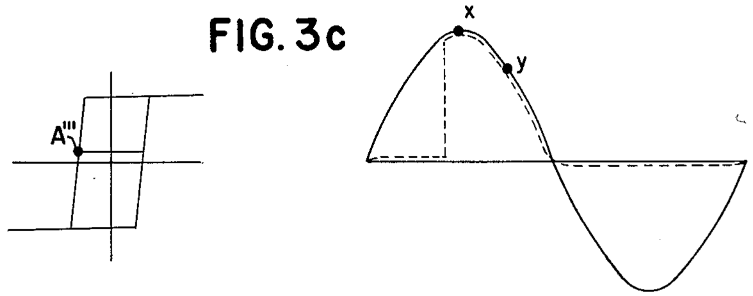
Figure 3D:
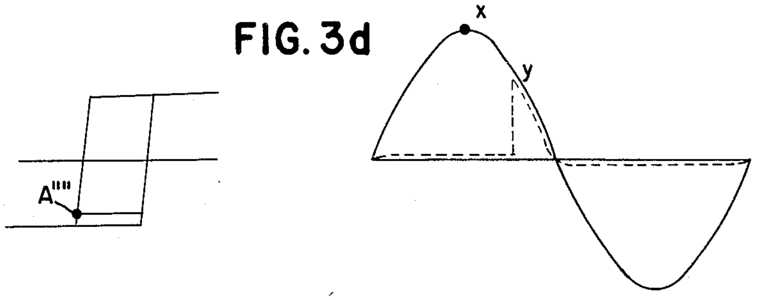

The B—H curve of FIGURE 3*b* indicates the flux density to be at point A″, just below the saturation point A, with a small control bias current. Because of the initial unsaturated condition of the core member, the impedance of element 13 is very high; consequently the potential drop thereacross is substantially equal to the supply potential. As nearly all the supply potential is lost across impedance element 13, the direct current potential level available at the cathode of diode 12 is very small in magnitude, as indicated by the initial portion of the dashed-line curve. However, later in the cycle, the supply current flow is of sufficient magnitude, as at point *r*, to produce a condition of saturation in the core member of element 13, thereby abruptly reducing its impedance to nearly zero. With this change of impedance, the potential drop across element 13 becomes insignificant, and the alternating current supply potential magnitude at the moment of saturation becomes available as a corresponding direct current potential level at the cathode of diode 12, which substantially follows the supply potential through the remainder of the positive-going portion of the cycle. FIGURES 3*c* and 3*d* similarly indicate the relation of output direct current potential to input supply potential for lower values of flux density, points A‴ and A⁗, hence increased values of control bias current.

It is evident, therefore, that the greater the change in flux density required to saturate the core member, the greater is the percentage of the positive-going portion of the cycle which must be traversed by the supply alternating current potential to increase the supply current to a sufficient magnitude to produce saturation and, hence, the greater the percentage of the cycle during which the impedance of element 13 is high. In a practical circuit, the control bias current is arranged to be of a sufficient magnitude to permit the saturation of the core member of impedance element 13 only during that portion of the input potential cycle between points *x* and *y* of the curves of FIGURES 3*a* through 3*d*, inclusive; hence, the impedance of element 13 remains high during the first half of the positive-going portion of each alternating current supply potential cycle. In this manner, the maximum input alternating current potential magnitude available as a corresponding direct current potential level at the cathode of diode 12 is determined by the impedance of impedance element 13.

To produce the control bias current which is directly proportional to the direct current output potential level, a differential amplifier consisting of type PNP transistors 21 and 22 may be employed. The base electrode of transistor 21 is connected to the junction of the series combination of zener diode 23 and a fixed resistor 27 connected between the negative line 18 of the power supply system and point of reference potential 32. As the potential drop across zener diode 23 remains constant with changes of direct current output potential, any change in the potential of the negative output with respect to the positive output will appear in an equal amount upon the base electrode of transistor 21. The base electrode of transistor 22 is connected along a voltage divider network comprising the series-parallel combination of fixed resistors 26, 29, and 30 and potentiometer 31 connected between negative line 18 of the power supply system and point of reference potential 32. With this arrangement, the proportion of the total potential between the negative and positive output of the power supply system which appears at the base electrode of transistor 22 is determined by the ratio of the resistors in this divider network. Potentiometer 31 may be adjusted to alter this ratio.

In this circuit, changes of direct current output potential level between the positive and negative output terminals 20 and 37, respectively, produce changes in negative bias potential upon the base electrode of transistor 21 relative to the emitter electrode of transistor 21 which are different in magnitude from the changes in negative bias potential upon the base electrode of transistor 22 relative to the emitter electrode of transistor 22. For example, and assuming that an output potential level of negative 20 volts is required, that the impedance ratio between zener diode 23 and series resistor 27 is arranged to equally divide a minus 20-volt potential, and that the resistances of fixed resistor 26 and the series parallel combination of resistors 29, 30, and potentiometer 31 are similarly arranged to equally divide a minus 20-volt potential, the bias of each base electrode in respect to its respective emitter electrode will be minus 10 volts. Should the output potential level increase to minus 21 volts, for example, the negative bias of the base electrode of transistor 21 relative to its emitter electrode would now be minus 11 volts because of the constant potential drop of 10 volts across zener diode 23. However, since the resistance values of the voltage divider network which provides the bias for the base electrode of transistor 22 are arranged to equally divide the output potential, the bias of the base electrode of transistor 22 relative to its emitter electrode will be minus 10.5 volts. As the base-emitter bias requirement for conduction through a type PNP transistor is that the base be negative in respect to the emitter, transistor 21 would tend to conduct heavier than transistor 22 with increases in direct current output potential level. Assuming the reverse, that the output potential of the power supply system drops to minus 19 volts, for example, the negative bias of the base electrode of transistor 21 relative to its emitter electrode would be now only minus 9 volts because of the constant 10-volt drop across the zener diode 23. However, the equal ratio of the series-parallel resistor network biasing the base of transistor 22 would equally divide this potential, thereby providing the base of transistor 22 with a bias of minus 9.5 volts relative to its emitter, thereby tending to make transistor 22 conduct more heavily.

As either transistor tends to conduct more heavily than the other, the negative bias potential difference between the base and emitter thereof tends to become less. Because the two emitters are tied together, the emitters of both transistors assume the same potential, thereby tending to hold the least heavily conducting transistor off because of the reduced negative bias potential differential between its base and its emitter.

As transistor 21 conducts, with an increase in the output direct current potential level, a control bias current, which increases as transistor 21 conducts more heavily, flows from point of reference potential 32, resistor 28, emitter-collector circuit of transistor 21, load resistor 24, through bias control coil 16 to negative line 18 of the power supply system. As has been previously brought out, this control bias current produces an opposing flux in the core of variable impedance element 13, thereby preventing a saturated condition until some time after the beginning of each positive half cycle of supply potential. This, as has been previously explained, reduces the peak value of supply potential and, consequently, tends to reduce the output direct current potential level. With a decrease in direct current output potential level, transistor 21 conducts less, thereby reducing the amount of control bias current through control bias winding 16. This reduction in control bias current permits the core of variable impedance element 13 to reach saturation, and hence a very low impedance, earlier during the positive half excursions of the supply potential, thereby increasing the peak value of supply potential with the attendant increase of direct current output potential level.

Should the load current increase, thereby tending to cause the direct current output potential level to fall off due to the impedance of the supply circuit, feed-back current flow through feed-back winding 15 would be increased. As this current is polarized, in relation to feed-back winding 15, to produce a flux in the core of variable impedance element 13 in phase with that produced by supply current flowing through the main winding 14, point A of the hysteresis loop of FIGURE 2 would be moved to the right along portion AD, thereby requiring less supply current to produce enough flux to saturate the core of variable impedance element 13 and reduce its impedance. As variable impedance element 13 may thus be caused to reach saturation earlier, the input peak alternating current potential level would be increased, thereby tending to raise the direct current output potential level.

In the event of a light load and the attendant reduced load current flow in the utilization circuitry associated with a power supply system controlled in this manner, filter capacitors 34 and 35 would tend to maintain their charge, which is substantially equal to the peak value of the input alternating current potential level at the moment rectification occurs as determined by the flux density and impedance of impedance element 13. This reduced potential difference across element 13 may reduce the magnitude of supply current flow to a value less than that required to saturate the core member. Under these conditions, there would be no direct current output potential, in that substantially all of the supply potential would be lost across impedance element 13. To avoid this consequence, an auxiliary circuit composed of the series combination of resistor 38 and diode 39 is connected across the output terminal 41, variable impedance element 13, and return line 18. With this arrangement, a second path for supply current flow is provided across the secondary winding of transformer 11 which is independent of the load current, thereby insuring a sufficient supply current flow through main winding 14 of the variable impedance element 13 to produce core saturation, regardless of the load current flow in the associated utilization circuitry.

In the interest of reducing drawing complexity, the present invention has been shown and described with a single phase input direct current potential power supply. It is to be specifically understood that the same arrangement may be used with a three-phase alternating current input wherein each phase has respective rectifier diodes and variable impedance elements. With a three-phase input device, the output side of each rectifier diode would be tied together at a point comparable to point 40, with the rest of the circuitry remaining the same. The respective bias control windings may be connected in series, as may be respective feed-back windings.

While a preferred embodiment of the present invention has been shown and described, it will be obvious to those skilled in the art that the various modifications and substitutions may be made without departing from the spirit of the invention, which is to be limited only within the scope of the appended claim.

What is claimed is:

In combination with a source of alternating current energy and a direct current power supply system having rectifier circuitry and an output circuit from which direct current energy may be applied to external circuitry, the direct current output potential level regulating arrangement comprising a variable inductive impedance element having a main coil, a feed-back coil, and a bias coil wound upon a core member of a material having substantially square hysteresis loop characteristics for each rectifier device of the power supply system, means for connecting said main coil in series with said source of alternating current energy and the respective rectifier device of said power supply system whereby the maximum input alternating current potential magnitude available as a corresponding direct current potential level at the cathode of each rectifier device is determined by the impedance thereof, means for directing at least a portion of the load current of said power supply through the said feed-back coil of said variable impedance element in such a manner as to alter the impedance thereof with the supply current for correcting decreases of direct current output potential level, differential amplifier means connected to the said output circuit of said power supply system for generating a control bias current which is directly proportional to output potential level, means for directing said control bias current through the said bias coil of said variable impedance element in such a manner as to alter the impedance thereof in a sense opposite to that produced by the supply current for correcting increases of direct current output potential level, and auxiliary circuit means connected in shunt across said source of alternating current energy between each said variable inductance impedance element and the associated said rectifier device of the power supply system to provide a second current path for supply current flow through said impedance element.

References Cited in the file of this patent

UNITED STATES PATENTS

| | | |
|---|---|---|
| 1,829,254 | Asch | Oct. 27, 1931 |
| 2,157,977 | Alrig | May 9, 1939 |
| 2,182,666 | Hanley | Dec. 5, 1939 |
| 2,790,127 | Hamilton | Apr. 23, 1957 |
| 2,830,250 | Fredrick et al. | Apr. 8, 1958 |
| 2,903,640 | Bixby | Sept. 8, 1959 |
| 2,945,171 | Louden | July 12, 1960 |
| 2,945,172 | Bixby | July 12, 1960 |
| 3,005,145 | McNamee | Oct. 17, 1961 |